United States Patent [19]

Moran

[11] 4,131,929
[45] Dec. 26, 1978

[54] BRIDGE CIRCUITS FOR SENSING CURRENTS IN A THREE-PHASE A.C. CIRCUIT

[75] Inventor: Richard J. Moran, Milwaukee, Wis.

[73] Assignee: McGraw-Edison Company, Elgin, Ill.

[21] Appl. No.: 780,815

[22] Filed: Mar. 24, 1977

[51] Int. Cl.² ............................................. H02H 3/08
[52] U.S. Cl. ....................................... 361/93; 361/97
[58] Field of Search ............... 361/97, 96, 98, 93, 361/94, 87, 71, 73, 75, 76, 77, 195, 196

[56] References Cited

U.S. PATENT DOCUMENTS

| | | | |
|---|---|---|---|
| 3,345,539 | 10/1967 | Ashenden et al. | 361/97 |
| 3,689,801 | 9/1972 | Engel et al. | 361/96 |
| 3,974,423 | 8/1976 | Ulyanitsky et al. | 361/87 |
| 4,060,844 | 11/1977 | Davis et al. | 361/96 |

Primary Examiner—J. D. Miller
Assistant Examiner—Patrick R. Salce
Attorney, Agent, or Firm—Thomas E. McDonald; Jon Carl Gealow; Ronald J. LaPorte

[57] ABSTRACT

A bridge circuit including an eight-leg full wave rectifier bridge connected to rectify the phase and neutral currents produced by three wye-connected current transformers magnetically coupled to respective phases of a three-phase electric power circuit, and used with one or more resistive elements to provide instantaneous D.C. voltage outputs at least once every current cycle, proportional to the highest and/or lowest peak phase current and to the peak neutral or ground current of the power circuit, for operating or preventing the operation of a circuit interrupter in the power circuit being measured.

9 Claims, 12 Drawing Figures

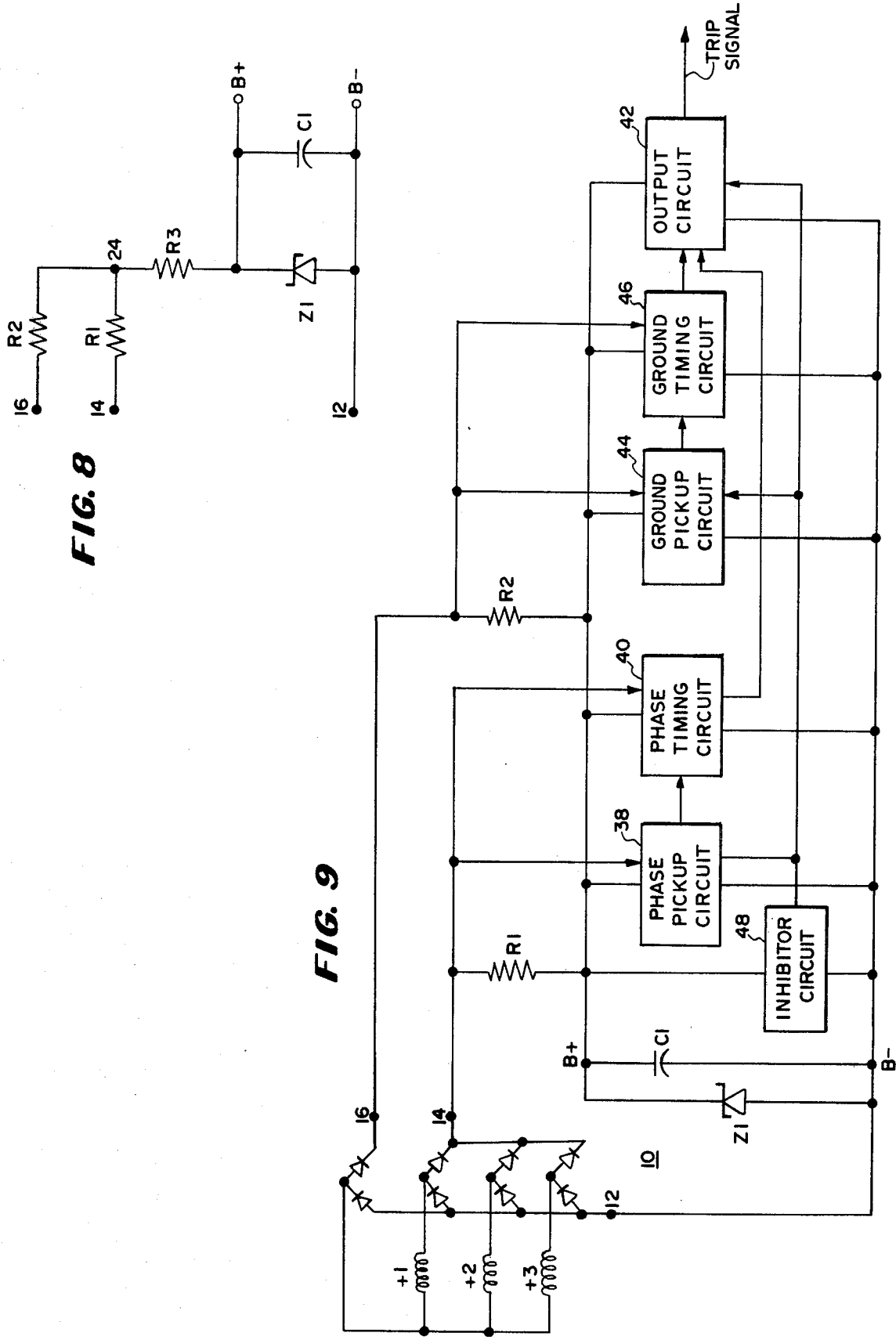

BRIDGE CIRCUITS FOR SENSING CURRENTS IN A THREE-PHASE A.C. CIRCUIT

BACKGROUND OF THE INVENTION

1. Field of the Invention

The invention relates generally to circuits for measuring electric current, and, more particularly, to circuits for measuring abnormally high or low phase currents, and/or ground overcurrent in a three-phase electric power circuit.

2. Prior Art

U.S. Pat. No. 4,007,401, issued Feb. 8, 1977, to Kimmel et al., discloses a well known six-path, three-phase, full wave rectifier bridge having its A.C. inputs supplied from three wye-connected current transformers coupled to respective phase lines of an electric power circuit, and a load resistor connected across its D.C. output. When used to measure current in an ungrounded three-phase, three-conductor circuit in which the three conductors are the only current paths, the D.C. voltage across the load resistor will be an accurate, proportionate measure of the sum of the positive polarity currents supplied by the current transformers, and thus a proportionate measure of the sum of the phase currents in the electric power circuit. However, this current measuring circuit is not suitable for three-phase circuits having a fourth current path, or the possibility of such, such as a grounded wye-connected system, in which the three-phase currents do not necessarily cancel. Since the only return current path to each current transformer is through the other two current transformers, when these three currents do not cancel, these current transformers will buck one another, and quickly saturate. As a result, the current measurement is inaccurate, and excessively high voltages can be generated across these current transformers.

In other known bridge circuits for measuring phase overcurrents in any type of three-phase circuit, three individual four-path, single phase, full wave rectifier bridges, each having its A.C. input supplied from a respective one of the three current transformers, are used to produce a D.C. output signal proportional to a respective phase current of the power circuit. The D.C. outputs of these individual single phase bridges can be connected in series, as shown in U.S. Pat. No. 3,689,801, issued Sept. 5, 1972, to Engel et al., or in parallel, as shown in U.S. Pat. No. 3,573,555, issued Apr. 6, 1971, to James W. Lipnitz, across a load resistor to produce a peak voltage across the resistor proportional to the highest value of current in any of the three phase lines. However, these measuring circuits cannot be used to measure a minimal value of current through any one of the three phase lines, which could be used, for example, to detect an open line condition, and trip a power line circuit breaker to thus prevent single phasing of the three-phase motor loads connected downline from the circuit breaker.

In known bridge circuits for producing a D.C. voltage proportional to the ground or neutral current in a three-phase, four-conductor, wye-connected power circuit, generally three current transformers are used in addition to the three current transformers used for measuring the phase currents, as disclosed in my U.S. Pat. No. 4,027,203 issued May 31, 1977. Alternatively, the same three current transformers can be used for both phase and ground overcurrent detection, by using additional transformers between the three current transformers and the individual phase or ground rectifier bridges. For example, each current transformer can be connected to the primary winding of a respective phase transformer, in series with a respective one of three primary windings of a ground transformer, with the secondary winding of each phase transformer and the ground transformer being connected to a single phase, full wave rectifier bridge, as disclosed in U.S. Pat. No. 3,803,455 to Henry G. Willard, issued Apr. 9, 1974.

SUMMARY OF THE INVENTION

In the current measuring circuit disclosed herein, three current transformers, each magnetically coupled to a respective one of the three phase lines of a three-phase electric power circuit, have wye-connected secondary windings with a corresponding end of each secondary winding being connected to a respective one of three phase input terminals of a rectifier, and the opposite end of each secondary winding being connected in common to a neutral input terminal of the bridge. The bridge includes four rectifier elements having their positive terminals connected to a common negative output terminal of the bridge, and their negative terminals connected to a respective one of the four A.C. input terminals of the bridge. Three other rectifier elements each have a positive terminal connected to a respective one of the three phase input terminals of the bridge, and a negative terminal connected to a common positive output terminal of the bridge. The last rectifier element of the bridge has a positive terminal connected to the neutral input terminal of the bridge, and a negative terminal connected to a neutral output terminal of the bridge.

The three output terminals of the bridge are connected by respective lines to a common point. A first resistive element inserted in the line between the neutral output terminal and the common point will produce a voltage at least once each current cycle proportional to a peak value of the ground or neutral current of the electric power circuit, which can be used with known ground pickup and timing circuits to trip a circuit breaker in the electric power line upon the occurrence of a ground overcurrent condition.

A second resistive element disposed in the line between the positive output terminal of the bridge and the common connecting point will produce three instantaneous voltages thereacross each current cycle which are proportional to a respective peak value of the three phase currents of the electric power circuit. Thus, the highest peak voltage produced across this resistor is proportional to the peak value of the highest phase current, and the lowest peak voltage is proportional to the peak value of the lowest phase current of the power circuit.

The second current sensing resistive element disposed in the line to the positive output terminal of the bridge can be used with known phase pickup and timing circuits to trip a circuit breaker upon the occurrence of a phase fault or overcurrent condition. Also, the signal produced by this resistor can be supplied to a minimum signal detecting circuit described herein which can be used with known circuit breaker control circuits to either trip the circuit breaker in the event of an abnormally low line current condition indicating an open line, to thereby prevent single phasing of three phase motor loads connected to the circuit. Also, the same circuit can be used to inhibit the operating of a ground fault tripping circuit of the circuit breaker, where most or all of the load on the three-phase line is single phase loads and it is not considered desirable to open all three phases because of an open condition on one of them.

A third resistor, disposed in the line connecting the negative output terminal of the bridge to the common connection point, will produce a voltage thereacross at least once every half cycle, proportional to the highest peak value of line current, which can be used with known phase pickup and timing circuits to trip a circuit breaker in the power line in the event of a phase overload condition.

BRIEF DESCRIPTION OF THE DRAWINGS

It is believed that the invention will be better understood by the following detailed description and drawings in which:

FIGS. 5–8 are schematic diagrams of different embodiments of the invention;

FIG. 9 is a schematic diagram, partially in block form, showing the embodiment of FIG. 5, connected with known pickup and timing circuits to operate a circuit breaker;

DESCRIPTION OF PREFERRED EMBODIMENTS

Figure 1:
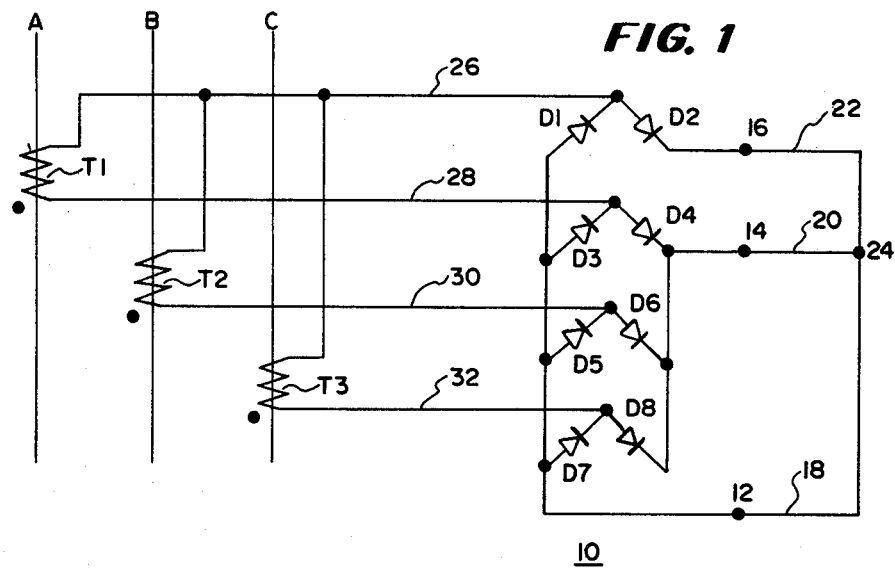
FIG. 1 is a schematic diagram of the rectifier bridge circuit.

The circuits shown in FIG. 1, include four pairs of series connected diodes D1-D2, D3-D4, D5-D6, and D7-D8, wherein in each pair, the cathode, or negative terminal, of one diode D1, D3, D5, D7 is connected to the positive terminal of the other diode D2, D4, D6, D8. The anodes, or positive terminals, of the diodes D1, D3, D5 and D7 are connected to a common line or terminal 12. The negative terminals of the diodes D4, D6, and D8 are connected to a common line or terminal 14, and the negative terminal of diode D2 is connected to a line or terminal 16. The three terminals 12, 14 and 16 are connected by respective lines 18, 20, 22 to a common terminal 24.

The secondary windings of three current transformers T1, T2, T3 are wye-connected, with a corresponding end of each secondary winding being connected by a neutral line 26 to the junction between the diodes D1 and D2, and the opposite ends of each of these secondary windings being connected by lines 28, 30 and 32 to the junctures of diodes D3 and D4, D5 and D6, and D7 and D8 respectively.

Figure 2:
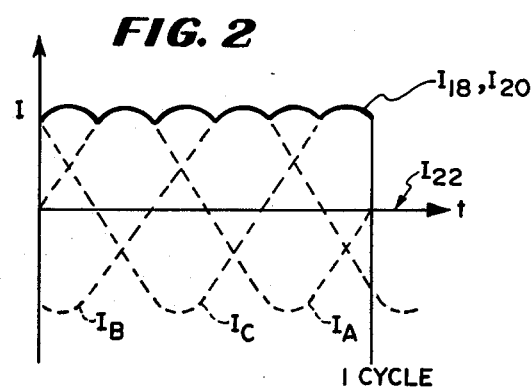
FIGS. 2, 3 and 4 are pictorial representations of the current outputs of this rectifier bridge, for various operating conditions of the electric power circuit.

When the phase currents in the power circuits are balanced, no rectified neutral current $I_{22}$ flows through the line 22 and the current $I_{20}$ flowing in line 20 is equal to the current $I_{18}$ flowing in line 18 and is a D.C. signal having six small sinusoidal humps per cycle as shown in FIG. 2.

When the system phase currents are not balanced, current will flow in the neutral or ground conductor and the D.C. current $I_{22}$ flowing through the line 22 will be proportional to a single polarity portion of this system neutral current. Thus the peak value of the current $I_{22}$ flowing in line 22 will be proportional to a peak value of the power system neutral current at least once every cycle and a current sensing element can be used in line 22 to accurately sense this peak value and trip a power line circuit interrupter upon the occurrence of a ground fault condition or abnormal imbalance in the load currents of the three phases.

Figure 3:
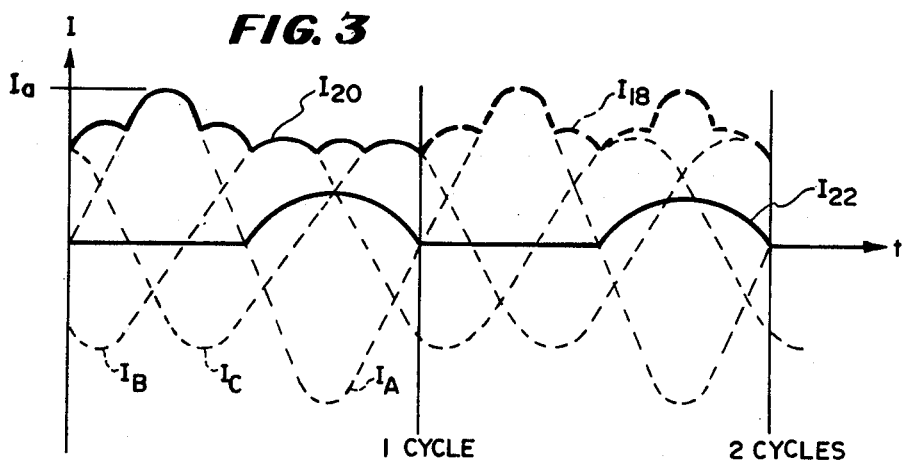

This is illustrated in FIG. 3 which shows the relative magnitudes and shapes of the rectified currents $I_{22}$, $I_{20}$ and $I_{18}$ which flow respectively in lines 22, 20 and 18 upon the occurrence of a condition, such as a downline ground fault, in which the phase A line current $I_A$ is approximately 50 percent greater than the currents $I_B$, $I_C$ flowing in phase B and C. The neutral current $I_{22}$, proportional to the neutral current $I_N$ of the power system, flows through the line 22 once each cycle during the half of the cycle when the current $I_{22}$ is at positive polarity. The current $I_{20}$ flowing through line 20, shown in FIG. 3 for the first cycle of this figure, is proportional to the instanteous sum of one polarity of the phase line currents $I_A$, $I_B$, $I_C$; thus, the peak value of $I_a$ of the current $I_{20}$ will be proportional to a single polarity peak value of the current $I_A$ flowing in line A of the power system and will occur once each cycle during the half-cycle when the current $I_{20}$ is of a positive polarity. A current sensing element can be used to sense this peak current $I_a$ in line 20 to trip a power line circuit breaker upon the occurrence of a phase overload condition.

The current $I_{18}$ flowing in line 18, shown by dashed lines in the second cycle of FIG. 3, will be proportional to the instantaneous sum of the positive polarity currents $I_A$, $I_B$, $I_C$ of the three phase currents and the neutral current $I_N$. Since the sum of the phase currents $I_B$, $I_C$ and the neutral current $I_N$ equals the phase current $I_A$, a peak value of the current $I_{18}$ in line 18 will occur during each half cycle of the phase current $I_A$. Thus the peak value of the current flowing in line 18 during one half cycle will be proportional to the positive polarity peak value of the phase current $I_A$ flowing in the power circuit, and, during the following half cycle, to a negative polarity peak value for the phase current $I_A$.

Figure 4:
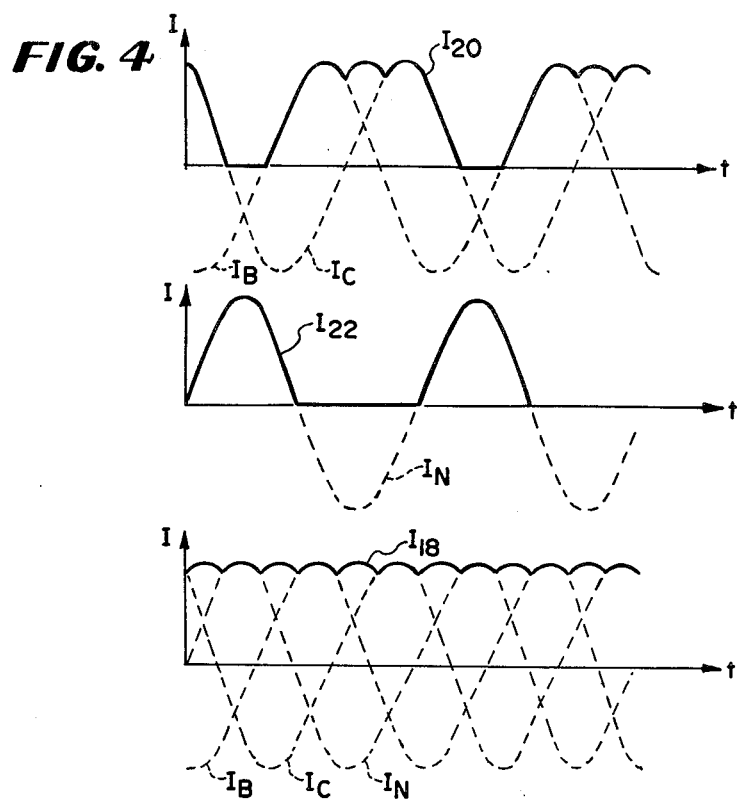

A current sensing element for sensing a current $I_{20}$ in line 20 can also be used to detect abnormally low phase currents indicative of one or more open lines or of upline fault conditions. FIG. 4 illustrates the wave shapes of the currents $I_{18}$, $I_{20}$, $I_{22}$ in lines 18, 20 and 22 when the phase currents were initially in balance and the phase line A is opened. When this occurs, there will a period of approximately 60 degrees per cycle in which no positive phase current $I_{20}$ will flow through the line 20, but during which the positive polarity neutral current $I_{22}$ will flow through the line 22. Similarly, if the voltage on one or more of the phase lines A, B, C drops to a low value because of an upline fault condition, this will be reflected by a minimal current $I_{20}$ flowing each cycle through the line 20. Such abnormally low phase currents can be detected by a current sensing element used to sense the current $I_{20}$ in line 20 to either trip, or to prevent tripping, of a power line circuit breaker.

Where no ground fault tripping is provided for the line breaker and most of the loads on the power system are three phase loads, the line breaker can be tripped upon indication of such an abnormally low line current condition to prevent single phasing of the three phase loads. On the other hand, where ground fault tripping of the line breaker is used, and most of the loads on the power circuit are single phase loads, it may be desirable, upon sensing such an abnormally low line current, to disable the ground fault tripping circuit so that the breaker will not trip and interrupt power to the single phase loads on the unaffected phases of the power system, and also to give warning of the abnormal line condition.

Since the current $I_{18}$ flowing through line 18 is proportional to the instantaneous sum of the phase and ground currents $I_A$, $I_B$, $I_C$, $I_N$, an element which senses the current $I_{18}$ in this line 18 will not give any indication of an open line condition, as shown in FIG. 4.

A resistor can be incorporated in any of these lines 18, 20, 22 to produce a voltage proportional to the current flow therethrough, as described hereinafter. However, other types of current sensors as for example a Hall generator, can be used equally as well.

Figure 5:
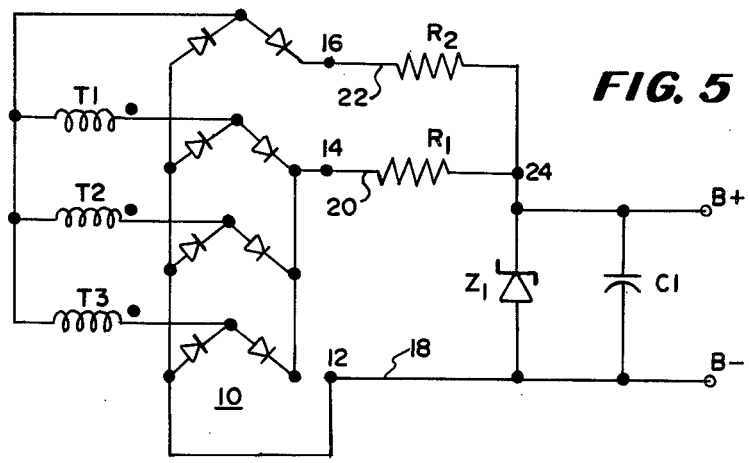

FIG. 5 illustrates an embodiment of this invention in which the line 20 includes a resistor R1 for producing at least one peak voltage per cycle corresponding to the highest of the peak current values of the phase lines A, B and C, line 22 includes a resistor R2 for producing a peak voltage once per cycle corresponding to a peak value of the power system neutral current, and line 18 includes a capacitor C1 connected in parallel with a zener diode Z1 which serves as a power supply for an overload and ground fault sensing circuit for tripping a line circuit breaker. The R2 pickup value can be sensitive and accurate because the current transformers are required to operate with at least 18 volts output, which minimizes the variation of exciting current in these transformers. The voltage output of these resistors R1, R2 can be used with signal processing, timing and output circuits similar to those described in the above-mentioned U.S. Pat. No. 4,027,203, and illustrated in FIGS. 9 and 10, to energize the trip coil 34 of a circuit breaker 36.

Figure 6:
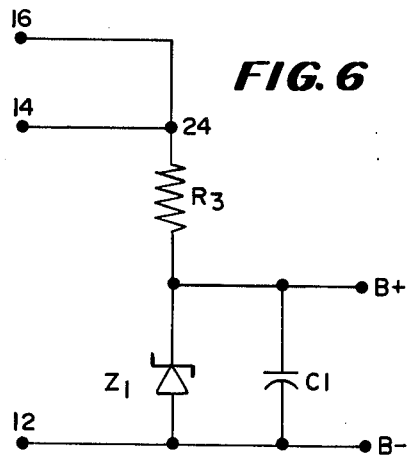

When current sensing resistors R1 and R2 are used in lines 20 and 22 as overcurrent and ground fault detectors, any line to ground overload or fault condition will be detected immediately by one of these sensors R1, R2. However, if ground fault sensing is not used, a resistor R3, connected between the common junction 24 and the power supply capacitor C1 in line 18, can be used instead of the resistor R1 to immediately detect a phase overcurrent condition and produce a peak voltage proportional to the peak current of phase A, B or C at least once every half cycle, as illustrated in FIG. 6.

Figure 7:
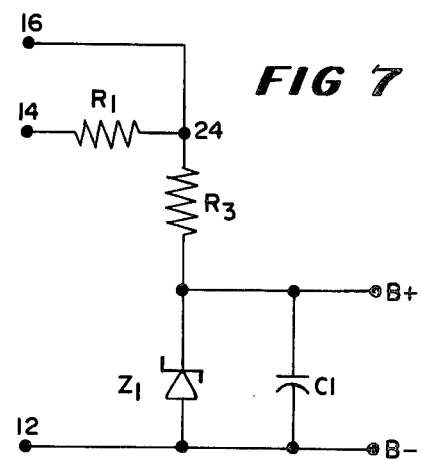

When no ground fault sensing is used and the resistor R3 is used for sensing phase overcurrent conditions, the current sensing resistor R1 in line 20 can still be used to sense an abnormally low line current in one or more phase lines, resulting from an upline fault condition or one or more open lines, and trip a power line circuit interrupter to prevent the single phasing of three phase motors on the system, as shown in FIG. 7.

Also, all three current sensing resistors R1, R2, R3 could be used, as shown in FIG. 8, with the resistor R3 being used to sense phase overcurrents, the resistor R2 being used to sense ground faults, and the resistor R1 being used to inhibit the tripping of a line circuit interrupter by the ground current sensing resistor R2 when the high ground current detected by the resistor R2 is caused by an abnormally low current in one or more of the phase lines.

Figure 10:
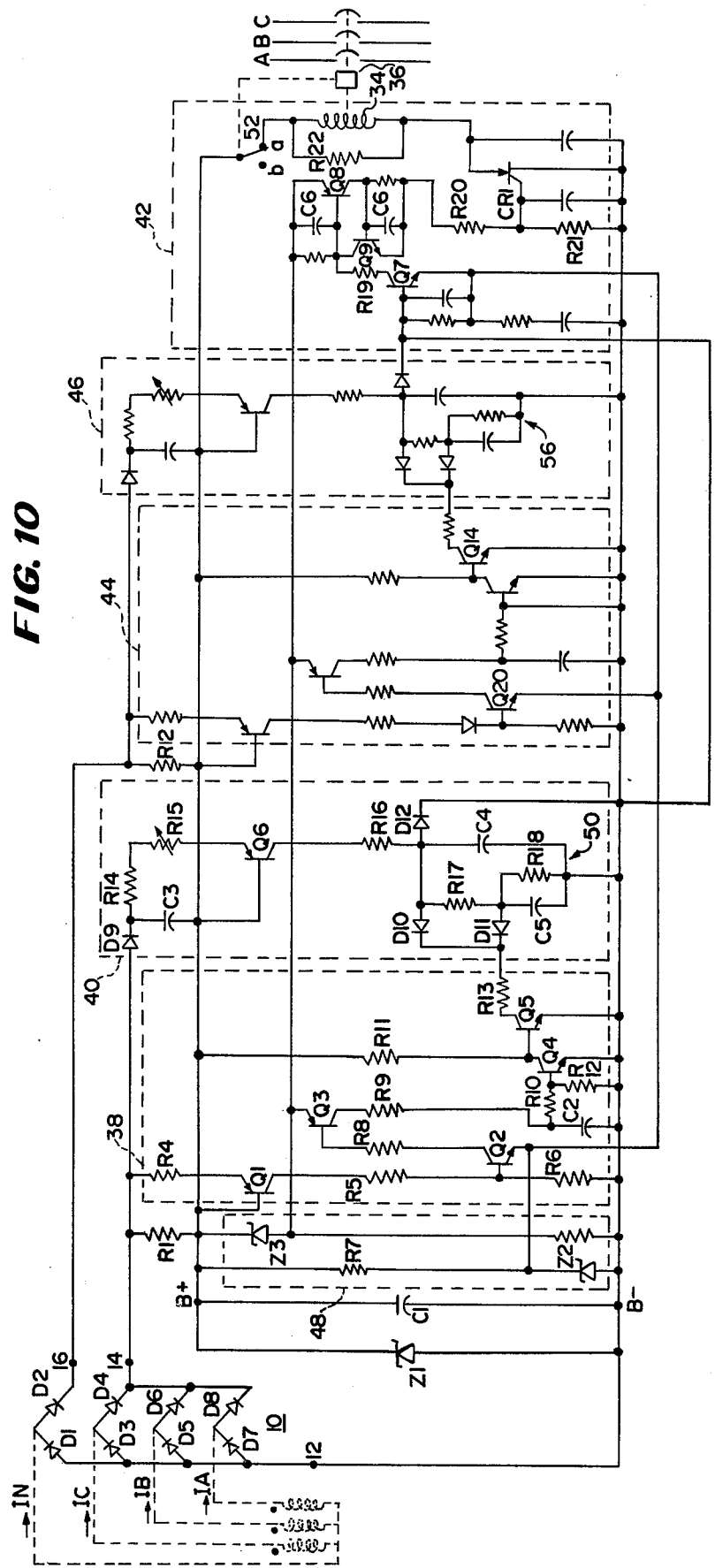
FIG. 10 is a more detailed schematic diagram of the circuit shown in FIG. 9.

FIGS. 9 and 10 illustrate how the current sensing circuit of FIG. 5 can be used with known signal processing, timing and output circuits such as described in the above-mentioned U.S. Pat. No. 4,027,203 to trip a power line circuit breaker 36 upon the occurrence of a phase overcurrent or ground fault condition.

The phase current sensing resistor R1 is connected from the phase terminal 14 of the bridge 10 to the positive side B+ of the power supply capacitor C1 whose negative side B− is connected to the negative terminal 12 of the bridge 10. The ground, or neutral current sensing resistor R2 is connected between the terminal 16 of the bridge 10 and the positive side B+ of the power supply capacitor C1. After the capacitor C1 has been charged to its rated voltage of about 18 volts, the zener diode Z1 connected across this capacitor C1 defines a low impedance path and thus maintains the sensing network functioning as a current source. As explained heretofore, the phase current sensing resistor R1 will produce a peak voltage proportional to a peak phase current of the electric power circuit at least once every cycle. Upon the occurrence of a predetermined minimum voltage across the resistor R1 indicating a phase overload condition, a phase pickup circuit 38 activates a phase timing circuit 40, which, after a time delay proportional to the peak voltage output of the resistor R1, actuates an output circuit 42 which trips the breaker 36.

In a similar manner the ground current sensing resistor R2 produces a peak voltage at least once per current cycle proportional to a peak value of ground current in the electric power circuit. Upon the occurrence of a predetermined minimum voltage output of the resistor R2 indicating a ground overcurrent or fault condition, a ground pickup circuit 44, similar to the phase pickup circuit 38, activates a ground timing circuit 46 similar to the phase timing circuit 40, which activates the output circuit 42 after a time delay proportional to the peak voltage output of the resistor R2. An inhibitor circuit 48 prevents operation of the phase and ground pickup circuits 38, 44 until the power supply capacitor C1 is charged to an operational level.

In the phase pickup circuit 38 shown in FIG. 10, a phase overcurrent sensing PNP transistor Q1 has its base connected to the B+ power supply line. The emitter of this transistor Q1 is connected in series with a resistor R4 to the phase terminal or line 14 of the bridge 10 and the collector is connected in series with coupling resistors R5 and R6 to the B− power supply line. The transistor Q1 is thus in a common base configuration and the resistor R4 is selected to be large to establish a high impedance detection means. A small current may therefore also flow from line 14 through the resistor R4 and the emitter-to-base junction of the sensing transistor Q1 to further charge the power supply capacitor C1 and bias transistor Q1 on. The conduction of transistor Q1 will develop a voltage across resistors R5 and R6. Resistor R6 is coupled to turn on a NPN transistor Q2, the output of which conducts if the inhibit circuit 48 indicates capacitor C1 has been charged to its operating level. The transistor Q1 has its base connected at the junction of the resistors R5 and R6 and its emitter connected to the B− ground supply line through a zener diode Z2. A small bias resistor R7 connects the zener diode Z2 to the B+ power supply line to maintain a small bias current.

The collector of the transistor Q2 is connected through a coupling resistor R8 to the base of a PNP transistor Q3 which has its emitter connected to the B+ power supply line through a zener diode Z3. Thus the transistor Q3 cannot conduct unless the capacitor C1 is at a selected voltage level sufficient to overcome the voltages of the zener diodes Z2 and Z3 as well as the base-to-emitter voltage of the transistor Q3. This is selected to be of a sufficient level to operate the output stage 42. The two zener diodes Z2, Z3 further function to produce a temperature stable detection of a fault condition in the presence of operating voltage.

The transistor Q1 is connected in a common base configuration such that its collector current will approximately equal its emitter current. The current supplied to the resistor R5 therefore is essentially directly proportional to the phase overcurrent and develops a bias voltage across the base-to-emitter junction of the transistor Q2 and the zener diode Z2. When that voltage exceeds the sum of these two voltages, transistor Q2 turns on. If the B+ power supply line is at operating voltage, transistor Q3 turns on in the corresponding period that the sensed current signal at line 14 exceeds the pickup value, and supplied an output signal indicative of a phase overcurrent condition. The collector of the transistor Q3 is connected in series with a resistor R9 and a hold-on capacitor C2 to the B− power supply line. A coupling resistor R10 connects the junction of the resistor R9 and capacitor C2 to the base of a NPN transistor Q4 which has its emitter connected to ground and its collector connected to the B+ power supply line in series with the resistor R11. A bias resistor R12 is connected across the base to the emitter of the transistor Q4 and in series with the resistor R10 to the B− power supply line. The time constant of the resistor R9 and capacitor C2 is selected to provide a very rapid charging of the capacitor C2, with then discharges through the resistor R10 and the base-to-emitter circuit of the transistor Q4 in parallel with the resistor R12.

Thus, in response to a phase overcurrent signal, the transistors Q2 and Q3 will be turned on during the peak period of each cycle of current. Such turn-on rapidly charges the capacitor C2 so that it will maintain the transistor Q4 on until the next peak period of the following current cycle to maintain a phase overcurrent signal as long as the capacitor C2 is recharged by each cycle. For example, the discharge time of the capacitor C2 may be selected to be in the order of 20 milliseconds. If the capacitor C2 is not charged by the next succeeding cycle, the capcitor will then completely discharge and turn off the transistor Q4 until a new peak current is sensed. The phase overcurrent output signal from the transistor Q4 is applied to the phase timing circuit 40, and in particular to the base of a normally conducting NPN transistor Q5 which is connected to hold the phase timing circuit 40 off. The emitter of transistor Q5 is connected to the B− ground supply line and the collector is connected in series with a limiting resistor R13 to the timing circuit 40, which is shown as a passive R-C network. In the absence of conduction of the transistor Q4, the transistor Q5 receives turn-on current through the resistor R11 and conducts. This resets and holds the timing circuit 40 in a standby or start position by discharging the capacitor network. When the transistor Q4 conducts, it bypasses input current from the transistor Q5 which turns off and permits the timing section 40 to initiate a timing cycle.

The phase timing circuit 40 includes a capacitor C3 connected in series with a blocking diode D9 across the phase overcurrent sensing resistor R1. The diode D9 connects the output of the phase line 14 to the capacitor C3, the opposite end of which is connected to the B+ power supply line. The peak output of the phase overcurrent signal will be stored on the capacitor C3 through the diode D9. The capacitor C3 discharges to the R-C timing network 50 through a fixed resistor R14 in series with an adjustable resistor R15 and the output of the PNP transistor Q6. The base of the transistor Q6 is connected to the B+ power supply line and the emitter is connected to the variable resistor R15, while the collector is connected to the R-C timing circuit 50 through a resistor R16. The timing supply capacitor C3 discharges through the resistors R14 and R15 and the emitter-to-base circuit of the transistor Q6 to turn the transistor Q6 on, providing emitter current essentially proportional to the signal on capacitor C3. The time constant of the discharge circuit is selected to establish a sufficiently high average current and thus stores a signal proportional to the peak value of the phase overcurrent. The transistor Q6 is connected in a common base configuration such that the emitter current follows the phase overcurrent level stored on the capacitor C3, and the collector current also essentially follows the phase overcurrent value to charge the R-C network 50 in accordance with the desired functioning and generates a trigger signal.

The number and arrangement of components in the R-C timing network 50 will vary, depending on the time-versus-current characteristics desired. The R-C network 50 illustrated in FIG. 10 includes a capacitor C4 having one end connected to the collector of the transistor Q6 through the resistor R16 and an opposite end connected to the B- power supply line. The R-C network 50 also includes another capacitor C5 having a positive side connected through resistor R17 and resistor R16 to the collector of the transistor Q6, and the negative side connected to the B− power supply line with a resistor R18 being connected across the terminals of this capacitor C5. The positive terminals of the common capacitor C4 and C5 are connected through respective diodes D10, D11 and resistor R13 to the collector of the transistor Q5 of the phase pickup circuit 38, to allow these capacitors to quickly discharge when the transistor Q5 is turned on. An output signal from the phase timing circuit 40 is supplied from the positive terminal of the timing capacitor C4 to the trip triggering circuit 42 through a blocking diode D12, which serves to isolate the R-C timing network of the phase timing circuit 38 from a similar R-C network in the ground timing circuit 46.

The output stage 42 includes a NPN coupling transistor Q7 having its base connected to receive the output signal from the phase and ground timing circuits 40, 46, its emitter connected to the B− power supply line through the zener diode Z2 and its collector connected through a coupling resistor R19 to the base of a PNP transistor Q8 and the collector of a NPN transistor Q9. The emitter of the transistor Q8 is connected to the B+ power supply line through the zener diode Z3. Transistors Q8 and Q9 are thus regeneratively interconnected to drive each other on in response to the initial turn-on switch for developing a pulse signal. The output stage 42 is preferably constructed employing discrete transistors Q8 and Q9 to permit the connection of small stablizing capacitors C6, one each across the input of each transistor Q8, Q9. The capacitors C6 prevent the triggering of this switching circuit by the rising power supply voltage B+, while permitting the regenerative action in response to an input signal from the phase or ground timing circuits 40, 46. The emitter of the transistor Q9 is connected to the B− power supply line through a pair of series-connected resistors R20 and R21. The gate-to-cathode input of a controlled rectifier CR1 is connected across the resistor R21. The controlled rectifier CR1 has an anode-to-cathode circuit connected in series with the circuit breaker trip coil 34 across the B+ and B− power supply lines. Thus, when the voltage across the resistor R21 rises to a turn-on voltage level, the controlled rectifier CR1 fires, energizing the trip coil 34, which operates the circuit breaker 36 to open the power line circuit. A holding resistor R22 is shown connected in parallel with the trip coil 34 to maintain current through the circuit and thus hold the controlled rectifier CR1 on until the circuit breaker trip coil 34 operates.

Thus the phase overcurrent detection system is driven from the power supply capacitor C1 with the system being inhibited until such time as the voltage is sufficient to reliably operate the system. The phase current sensing resistor R1 establishes a minimum phase trip current as well as developing a voltage on the timing capacitor network 50 proportional to the pickup value of current. Therefore, by providing different values of sensing resistors R1, the same time delay network yields the same curve for different normalized values of pickup current.

The ground fault detection system is similarly driven from the power supply capacitor C1 and is similarly inhibited until the power supply voltage is sufficient to reliably operate the system. The ground pickup circuit 44 and ground timing circuit 46 correspond closely with the phase pickup and timing circuits 38, 40 and are not discussed in detail herein. The values of the timing capacitors and resistors may be different than those of the phase timing circuit to produce a different current-time tripping curve but otherwise the two systems can be identical. As with the phase current sensing resistor R1, different values of resistance can be used for the ground current sensing resistor R2, with the same ground time delay network yielding the same current-time tripping curve for different normalized values of ground pickup current.

Figure 11:
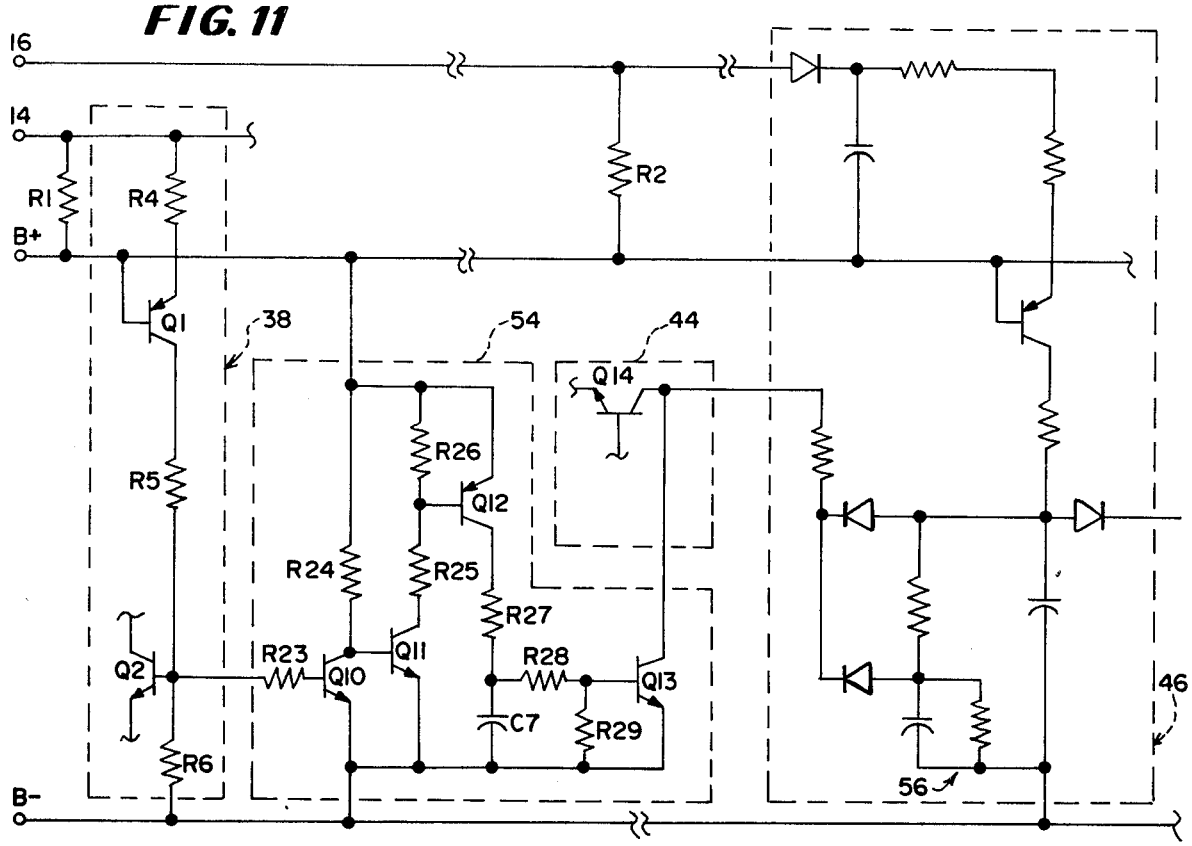
FIG. 11 is a schematic diagram of a ground fault restraint circuit for use with the embodiment of FIG. 10.

As previously discussed the positive polarity phase current sensing resistor R1 can also be used to sense abnormal line current conditions caused by one or more open lines or by an upline fault condition to either trip or to prevent the tripping of a line circuit breaker. FIG. 11 illustrates a ground fault restraint circuit 54, connected between the phase pickup circuit 38 and the ground timing circuit 46 of the embodiment of this invention shown in FIG. 10, which can be used to prevent the ground fault detection system from tripping the power line circuit breaker 36 upon the occurrence of an open line condition. This circuit 54 includes a NPN transistor Q10 whose base is connected through a resistor R23 to the base of the transistor Q2 in the phase pickup circuit 38, with the emitter of this transistor Q10 being connected to the B− power supply line and the collector of this transistor Q10 being connected to the base of another NPN transistor Q11, and also through a resistor R24 to the B+ power supply line. The transistor Q11 has its emitter connected to the B− power supply line and its collector connected through two series-connected resistors R25 and R26 to the B+ power supply line. The collector of the transistor Q11 is also connected to the base of a PNP transistor Q12 through the resistor R25. The emitter of the transistor Q12 is connected to the B+ power supply line, and its collector is connected through a resistor R27 and a capacitor C7 to the B− power supply line. The positive side of the capacitor C7 is connected through a resistor R28 to the base of a NPN transistor Q13. Also a discharge path for the capacitor C7 is provided by the resistor R28 in series with a resistor R29 connecting the resistor R28 and the base of the transistor Q13 to the B− power supply line. The emitter of the transistor Q13 is connected to the B− power supply line, and the collector of this transistor Q13 is connected to the collector of a PNP transistor Q14 in the ground pickup circuit 44 corresponding to the above described PNP transistor Q5 in the phase pickup circuit 38.

The resistor R6 of the phase pickup circuit 38 sees substantially the same wave form as the phase current sensing resistor R1. Thus during normal system operation in which respective load currents are flowing through each of the three phase lines, a continuous D.C. current flows through the resistor R6, and the transistor Q10 of the circuit 54, which has its base-to-emitter junction connected across the resistor R6 through the resistor R23, is normally turned on by the bias voltage produced by the resistor R6. Since this transistor Q10 is connected across the base-to-emitter junction of the transistor Q11, whenever the transistor Q10 is turned on there is insufficient bias voltage between the base and the emitter of the transistor Q11 and this transistor is turned off. Similarly the transistor Q12 is turned off also, since no bias voltage is provided for the transistor Q12 when the transistor Q11 is turned off. There is no charge on the capacitor C7, and the output transistor Q13 is also turned off.

When voltage is lost on one of the phase lines of the power system due to an open line or an upline phase-to-ground fault condition, the current flowing through the resistor R6, and the corresponding voltage output thereof, will decrease to zero for a period of approximately 60 electrical degrees each cycle, as illustrated graphically in FIG. 4. Similarly, two open lines will result in an off period of 180 degrees, and, of course, three open lines will produce a continuous off period. Thus if one or more lines are open, then off periods of 60 degrees or more occur each cycle during which the transistor Q10 loses its on biasing voltage and turns off. When the transistor Q10 is turned off, the transistors Q11 and Q12 are turned on and the capacitor C7 quickly charges to a value sufficient to turn on the transistor Q13. When the transistor Q13 is turned on, it diverts the timing current of the ground timing circuit 46 from the R-C timing network 56 equivalent to the R-C timing network 50 of the phase timing circuit 40 to the B− power supply line. The discharge resistor R28 is chosen so that the charge on the capacitor C7 is sufficient to maintain the transistor Q13 turned on so long as the capacitor C7 is recharged each cycle. While ground pickup may occur, so long as the transistor Q13 remains turned on, the ground timing circuit 46 is prevented from supplying an output signal to the trip circuit 42 by the bypassing of the timing current through the transistor Q13. The voltage across the capacitor C7 can also be used to trigger an alarm circuit indicating this open line condition. If the apparent open line or upline fault condition is temporary and the power system returns to normal, so that the transistor Q10 remains on for more than one cycle, the capacitor C7 is discharged through the resistors R29 and R28, the current output transistor Q13 is turned off, and the ground fault detection system is again made operative to detect downline ground faults and provide an output signal to trip the circuit breaker 36.

Figure 12:
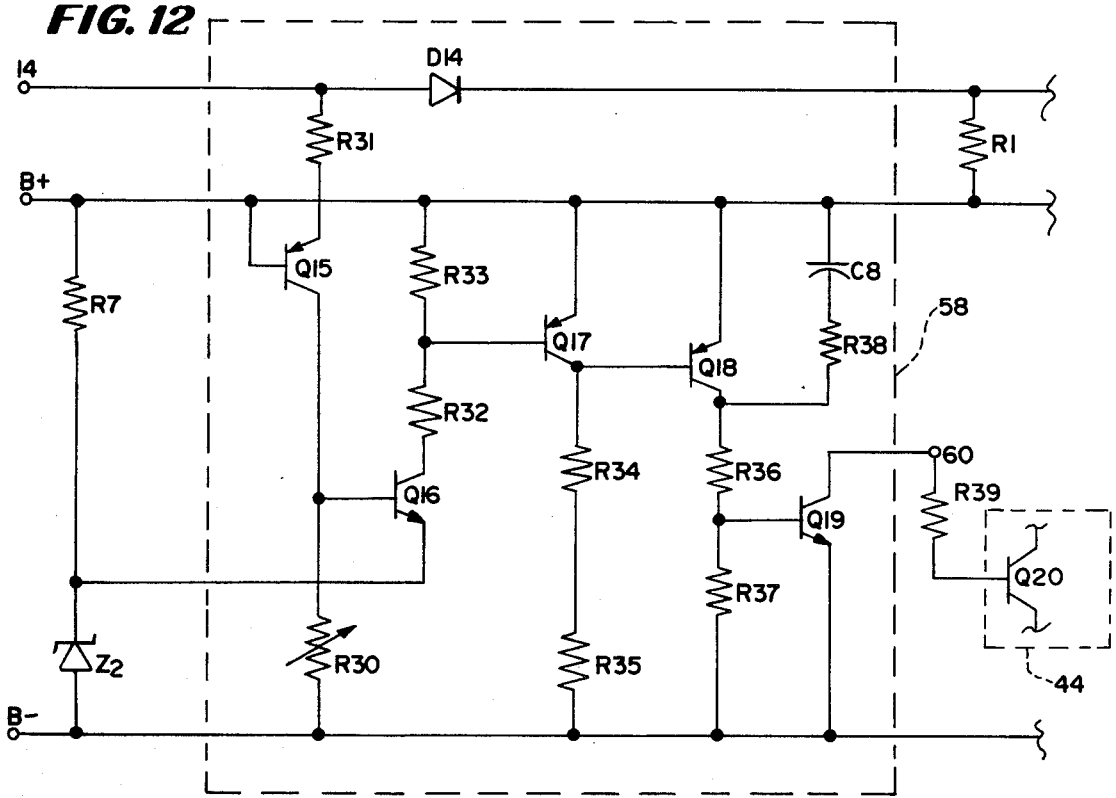
FIG. 12 is a schematic diagram of a phase minimum current level detector for use with the embodiment of FIG. 10.

The detection circuit 58, schematically depicted in FIG. 12, can be used with the phase current sensing resistor R1 of FIG. 10 to sense a minimum level of current in one or more phase lines of an electric power system which is considered to be abnormal, as for example, a reduction in the load current of one or more lines that is caused by an upline fault on the system. This circuit includes a PNP transistor Q15 having an emitter connected to the B+ power supply. The collector of this transistor Q15 is connected to the base of a NPN transistor Q16 and also through an adjustable resistor R30 to the B− supply line. The emitter of the transistor Q15 is connected through a resistor R31 to the phase terminal line 14 of the bridge 10 ahead of the phase current sensing resistor R1, with the line 14 including a rectifier D14 between the resistor R31 and the phase current sensing resistor R1 to compensate for the base-emitter drop of the transistor Q15, so that the resistor R31 sees almost exactly the same wave form as the phase resistor R1. The transistor Q16 has a collector connected to the B+ power supply line through the resistors R32 and R33 in series, and to the base of a PNP transistor Q17 through the resistor R32. The emitter of the transistor Q16 is connected to the B− supply line through the zener diode Z2 of the inhibitor circuit 48 so that the variable resistor R30 can be adjusted whereby some minimum percentage of the phase pickup current will cause Q16 to go off momentarily every cycle. The collector of the transistor Q17 is connected to the base of another PNP transistor Q18, and to the B− supply line through the series-connected resistors R34 and R35. The emitters of both transistors Q17 and Q18 are connected to the B+ supply line. The collector of the transistor Q18 is connected to the B− supply line through the resistors R36 and R37 in series, to the base of a NPN output transistor Q19 through the resistor R36, and to the B+ supply line through a series-connected resistor R38 and a capacitor C8. The emitter of the output transistor Q19 is connected to the B− supply line, and its collector is connected to an output terminal 60.

When the current in one or more of the phase lines of the electric power system drops below the minimal level determined by the setting of the variable resistor R30, the transistor Q16 turns off, which causes transistor Q17 to turn off and transistor Q18 to turn on. When transistor 18 turns on, it turns on the output transistor Q19 and also allows the capacitor C8 to quickly discharge, so that when the transistor Q18 is turned off, the capacitor C8 will recharge through the resistors R38, R36 and R37 at a rate sufficient to keep the output transistor Q19 turned on for at least one cycle until the next minimal current "off" period of the transistor Q16.

Where a ground fault detection circuit such as that shown in FIG. 10 is used, the output terminal 60 of the transistor Q19 can be connected to prevent tripping of the circuit breaker 36 by the ground fault detection circuit in the same way as the output transistor Q13 of the circuit 54 shown in FIG. 11 is connected. If ground fault tripping is not used, the output of transistor Q19 can be connected to energize the trip coil 34 of the circuit breaker 36 after a predetermined time delay, to thereby prevent single phasing of three-phase loads on the power system. Also, this output transistor Q19 can be connected to merely give warning or indication that the load currents in at least one of the phase lines of the power systems are abnormally low.

The output transistor Q19 can also be connected through a resistor R39 to the base of a NPN transistor Q20 in the ground pickup circuit 44 equivalent to the NPN transistor Q2 of the phase pickup circuit 38, to raise the ground pickup value by reducing the impedance path between the base of Q20 and B−.

If desired, the circuits of FIGS. 11 or 12 can be modified to give individual indication of abnormally low line current in one, two, or all three phases of a power system. For example, in FIG. 12 three capacitors whose negative sides are connected to the B− supply line and whose positive sides are each connected through a respective variable charging resistor to the B+ supply line to be charged therefrom, can have their positive sides connected through respective isolating diodes to the collector of a NPN current sensing control transistor whose emitter is connected to the B− line and whose base is connected to the junction of R34 and R35. The positive side of each capacitor is also connected to the B− power supply line through a non-linear resistive element and a discharge resistor connected in series with the element, so that when the capacitor is charged to a selected voltage, the non-linear element breaks down to produce an output signal pulse through the discharge resistor, to activate an alarm or indicating circuit. When all phase currents are higher than the selected minimum level, the transistor Q10 is turned on and all three capacitors discharged. When one or more of the phase currents are abnormally low, the transistor Q10 turns off and all three capacitors start to charge. The respective variable charging resistors can be adjusted so that one capacitor circuit will produce an output pulse only when all three phase currents are low, a second capacitor circuit will produce an output pulse only when at least two phase currents are low, and the third, when at least one phase current is abnormally low. For example, respective pulse outputs could be produced when the transistor Q10 remains turned off for 45, 180 and 270 electrical degrees each cycle, to thus indicate an abnormal low current condition on one, two or all three phases of the power system.

Since various modifications, adaptations are variations of the foregoing specific disclosure can be made without departing from the teachings of the present invention, it is intended that the spirit and scope of this invention be limited only by the terms of the appended claims.

What is claimed is:

1. A current sensing circuit for sensing currents in a three-phase electric power line, which comprises:
   three current transformers, each having a secondary winding magnetically coupled to a respective one of the three phase conductors of the power line to produce an A.C. current therethrough proportional to the current in the respective phase conductor;
   first, second and third rectifier elements, each connected at a positive end thereof to a negative bridge output and at an opposite negative end thereof to a first end of a respective one of the current transformer secondary windings;
   fourth, fifth and sixth rectifier elements, each connected at a positive end therof to the first end of a respective current transformer secondary winding and at an opposite negative end thereof to a positive bridge output;

a seventh rectifier element, connected at a positive end thereof to the negative bridge output and at an opposite negative end thereof to an opposite second end of each of the three current transformer secondary windings;

an eighth rectifier element, connected at a positive end thereof to the second end of each of the current transformer secondary windings and at an opposite negative end thereof to a mutual bridge output;

first, second and third connecting means for respectively connecting the mutual, positive, and negative bridge outputs to a common point, whereby current flowing through the first connecting means is proportional to one polarity of the power line neutral current, current flowing through the second connecting means is proportional to the instantaneous sum of one polarity of the power line phase currents, and current flowing through the third connecting means is proportional to the instantaneous sum of one polarity of the power line phase and neutral currents; and at least two current sensing means, each disposed in a respective one of the three connecting means, for sensing current therein.

2. A current sensing circuit for sensing currents in a three-phase electric power line, wherein said current sensing means comprises:

three current transformers, each having a secondary winding magnetically coupled to a respective one of the three phase conductors of the power line to produce an A.C. current therethrough proportional to the current in the respective phase conductor;

first, second and third rectifier elements, each connected at a positive end thereof to a negative bridge output and at an opposite negative end thereof to a first end of a respective one of the current transformer secondary windings;

fourth, fifth and sixth rectifier elements, each connected at a positive end thereof to the first end of a respective current transformer secondary winding and at an opposite negative end thereof to a positive bridge output;

a seventh rectifier element, connected at a positive end thereof to the negative bridge output and at an opposite negative end thereof to an opposite second end of each of the three current transformer secondary windings;

an eighth rectifier element, connected at a positive end thereof to the second end of each of the current transformer secondary windings and at an opposite negative end thereof to a mutual bridge output;

first, second and third connecting means for respectively connecting the mutual, positive, and negative bridge outputs to a common point, whereby current flowing through the first connecting means is proportional to one polarity of the power line neutral current, current flowing through the second connecting means is proportional to the instantaneous sum of one polarity of the power line phase currents, and current flowing through the third connecting means is proportional to the instantaneous sum of one polarity of the power line phase and neutral currents; and a first resistive element disposed in the second connecting means;

whereby each power line phase current produces a D.C. voltage across the first resistive element each current cycle thereof having a peak value proportional to the peak value of one polarity of the corresponding power line phase current so that the highest voltage produced across the first resistive element is proportional to the highest power line phase current, and the lowest voltage produced across the first resistive element is proportional to the lowest power line phase current.

3. A current sensing circuit as described in claim 2, which further comprises:

a circuit interrupter disposed in the power line;

tripping means for the circuit interrupter;

phase pickup means, connected across the first resistive element, for actuating phase timing means for at least one current cycle whenever a predetermined minimum voltage is produced across the first resistive element for a predetermined period of time;

said phase timing means, also connected across the first resistive element, for actuating the circuit interrupter tripping means after a time delay proportional to the highest peak voltage produced across the first resistive element.

4. A current sensing circuit as described in claim 3, which further comprises:

a minimum phase current detection means, connected across the first resistive element, for producing an output signal for at least one current cycle whenever the voltage across the first resistive element falls below a predetermined minimum level.

5. A current sensing circuit as described in claim 4, wherein said current sensing means further comprises:

a second resistive element disposed in the first connecting means;

whereby the power line neutral current produces a D.C. peak voltage across the second resistive element each current cycle thereof proportional to one polarity of the peak value of the power line neutral current.

6. A current sensing circuit as described in claim 5, which further comprises:

ground pickup means, connected across the second resistive element, for actuating ground timing means for at least one current cycle whenever a predetermined minimum voltage is produced across the second resistive element for a predetermined time; and said ground timing means, also connected across the second resistive element, for actuating the circuit interrupting tripping means after a time delay proportional to the peak voltage produced across the second resistive element.

7. A current sensing circuit as described in claim 6, which further comprises:

restraining means, connected to receive the output signal from the minimum phase current detection means, for deactivating the resetting the ground timing means upon receipt of the output signal of the minimum phase current detection means.

8. A current sensing circuit as described in claim 6, which further comprises:

modifying means, connected to receive the output signal from the minimum phase current detection means for raising the ground pickup value.

9. A current sensing circuit for sensing currents in a three-phase electric power line, which comprises:

three current transformers, each having a secondary winding magnetically coupled to a respective one of the three phase conductors of the power line to produce an A.C. current therethrough proportional to the current in the respective phase conductor;

first, second and third rectifier elements, each connected at a positive end thereof to a negative bridge output and at an opposite negative end thereof to a first end of a respective one of the current transformer secondary windings;

fourth, fifth and sixth rectifier elements, each connected at a positive end therof to the first end of a respective current transformer secondary winding and at an opposite negative end thereof to a positive bridge output;

a seventh rectifier element, connected at a positive end thereof to the negative bridge output and at an opposite negative end thereof to an opposite second end of each of the three current transformer secondary windings;

an eighth rectifier element, connected at a positive end thereof to the second end of each of the current transformer secondary windings and at an opposite negative end thereof to a mutual bridge output;

first, second and third connecting means for respectively connecting the mutual, positive, and negative bridge outputs to a common point, whereby current flowing through the first connecting means is proportional to one polarity of the power line neutral current, current flowing through the second connecting means is proportional to the instantaneous sum of one polarity of the power line phase currents, and current flowing through the third connecting means is proportional to the instantaneous sum of one polarity of the power line phase and neutral currents; and a resistive element disposed in the first connecting means;

whereby the power line neutral current produces a D.C. peak voltage across said resistive element each current cycle thereof proportional to one polarity of the peak value of the power line neutral current.

* * * * *